(12) United States Patent
Choi (10) Patent No.: US 12,463,512 B2
(45) Date of Patent: Nov. 4, 2025

(54) METHOD OF INSERTING A HAIRPIN

(71) Applicants:Hyundai Motor Company, Seoul (KR); Kia Corporation, Seoul (KR)

(72) Inventor: Seung Min Choi, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/396,303

(22) Filed: Dec. 26, 2023

(65) Prior Publication Data

US 2024/0128842 A1    Apr. 18, 2024

Related U.S. Application Data

(62) Division of application No. 17/828,369, filed on May 31, 2022, now Pat. No. 11,881,748, which is a division of application No. 16/994,999, filed on Aug. 17, 2020, now Pat. No. 11,356,004.

(30) Foreign Application Priority Data

Jun. 25, 2020    (KR) ........................ 10-2020-0077599

(51) Int. Cl.
*H02K 15/064*    (2025.01)
*B21D 7/06*    (2006.01)

(52) U.S. Cl.
CPC ............. *H02K 15/064* (2013.01); *B21D 7/06* (2013.01); *Y10T 29/49002* (2015.01); *Y10T 29/49009* (2015.01); *Y10T 29/53161* (2015.01)

(58) Field of Classification Search
CPC .... H02K 15/064; H02K 15/0421; H02K 1/16; H02K 15/085; H02K 15/0056; Y10T 29/49009; Y10T 29/53091; Y10T 29/49002
USPC ...... 29/596, 592.1, 598, 606, 732, 736, 825, 29/874, 882
See application file for complete search history.

(56) References Cited

U.S. PATENT DOCUMENTS

| | | | |
|---|---|---|---|
| 7,480,987 B1 | 1/2009 | Guercioni | |
| 11,063,500 B2 | 7/2021 | Ponzio et al. | |
| 11,515,767 B2 * | 11/2022 | Ruggieri | .............. H02K 15/064 |
| 11,616,426 B2 * | 3/2023 | Ponzio | ............... H02K 15/0421 29/596 |
| 2021/0006141 A1 * | 1/2021 | Ruggieri | .............. H02K 15/063 |
| 2021/0104941 A1 | 4/2021 | Jang | |

FOREIGN PATENT DOCUMENTS

| | | |
|---|---|---|
| CN | 109986343 A | 7/2019 |
| EP | 2763295 A1 | 8/2014 |
| KR | 101440066 B1 | 9/2014 |
| KR | 101541663 B1 | 8/2015 |
| KR | 20190077018 A | 7/2019 |
| WO | 2018092022 A1 | 5/2018 |

\* cited by examiner

*Primary Examiner* — Thiem D Phan
(74) *Attorney, Agent, or Firm* — Slater Matsil, LLP (57) ABSTRACT

A method can be used for molding a hairpin inserted into a stator core using a clamping unit that includes a connection bracket mounted on a front end of a robot arm and at least one clamper mounted on the connection bracket. The method includes reciprocally driving the clamping unit in opposite directions in a straight line, and press molding a head portion of the hairpin using a molding jig driven by the at least one clamper.

5 Claims, 7 Drawing Sheets

METHOD OF INSERTING A HAIRPIN

CROSS-REFERENCE TO RELATED APPLICATIONS

This application is a divisional application of U.S. patent application Ser. No. 17/828,369, filed on May 31, 2022, which is a divisional application of U.S. patent application Ser. No. 16/994,999, filed on Aug. 17, 2020, which claims priority to Korean Patent Application No. 10-2020-0077599, filed in the Korean Intellectual Property Office on Jun. 25, 2020, which applications are hereby incorporated herein by reference.

TECHNICAL FIELD

The present invention relates to an apparatus for molding a hairpin and a method of inserting a hairpin using the same.

BACKGROUND

Recently, a method for improving the output of a motor has been actively researched and developed to improve performance of electric vehicles.

In general, the output of the motor is known to be proportional to the number of turns of a stator coil wound on a stator core.

Accordingly, in order to improve the output without increasing the size of the motor, a method of increasing the space factor of the stator coil wound on the stator core may be considered.

As part of the above-described method, instead of using a circular coil having a circular cross-section, a method of winding using a flat coil having a square cross-section has been researched.

However, in the case of flat coils, there are relative difficulties in winding coils compared to circular coils.

Therefore, as a method of facilitating winding in a flat coil, a type of motor (hereinafter called a hairpin winding motor) has been proposed, in which a plurality of separated hairpin type stator coils (hereinafter referred to as hairpins) are inserted into the stator core, and then respective hairpins are welded to form a coil winding part.

In the hairpin winding motor as described above, U-shaped hairpins are inserted into each slot of the stator core, and then the hairpins disposed in each layer of each slot are welded to form a coil winding of the stator core.

Here, the process of molding the hairpins may be classified into a computerized numerical control (CNC) molding method and a press molding method. Since there are several types of hairpins in one hairpin drive motor, the CNC molding method capable of handling various types of hairpins is advantageous.

However, the CNC molding method capable of handling various types of hairpins according to conventional art consumes about six seconds for the production speed of one hairpin, so the production speed is slightly slow. In contrast, the press molding method with faster speed generally takes about three seconds for each hairpin, having twice the productivity compared to the CNC molding method, but there is a drawback of handling only a single type of hairpins.

Therefore, it may be advantageous to research and develop a method providing capability of molding plural types of hairpins and inserting the hairpins into the stator coil.

The above information disclosed in this Background section is only for enhancement of understanding of the background of the invention, and therefore it may contain information that does not form the prior art that is already known to a person of ordinary skill in the art.

SUMMARY

An apparatus for molding a hairpin inserted into a stator core includes a clamping unit including a connection bracket mounted on a front end of a robot arm and at least one clamper mounted on the connection bracket and reciprocally driven in opposite directions in a straight line, and a mold unit detachably coupled with the at least one clamper and press molding a head portion of the hairpin by a molding jig driven by the at least one clamper.

The at least one clamper may include a pair of clampers, each of which may include a first end mounted on the connection bracket and a second end on which a fitting end protrudes. The pair of clampers may reciprocate to become closer and farther with reference to a central portion of the connection bracket.

The fitting end may be slidably inserted into a mounting slot formed in the molding jig.

The mold unit may be detachably coupled with the connection bracket at a position between the at least one clamper, by a fixing chuck.

The fixing chuck may include a fixing block mounted on the connection bracket, and a plurality of fixing pins disposed along an exterior circumference of the fixing block, and operable to be inserted into the fixing block and to protrude on the fixing block 33.

The mold unit may include a fixing plate coupled to the connection bracket through the fixing chuck, a support bar fixed to the fixing plate, and at least one molding jig coupled with the at least one clamper and driven by the at least one clamper to move along the support bar to mold a head portion of the hairpin.

The at least one molding jig may include a first jig and a second jig coupled with the at least one clamper. The first jig and the second jig may be moved to be closer or farther along a guide bar.

A method of inserting a hairpin into a stator core may include unwinding a coil spiral-wound on an uncoiler, forming a decoated portion by decoating a predetermined portion on the coil by a heating device, bending the coil in multiple stages to two-dimensionally form a leg portion and a head portion by a bending device, cutting the coil formed with the leg portion and the head portion by a predetermined length by a cutting device, and moving the hairpin to be inserted into the stator core while three-dimensionally forming the head portion, by a same molding apparatus.

The bending of the coil in multiple stages may be performed by a computerized numerical control bending device.

The bending of the coil in multiple stages may be performed by a press bending device.

The moving of the hairpin to be inserted into the stator core while three-dimensionally forming the head portion includes coupling a fixing block to a fixing chuck of a connection bracket while a molding jig is inserted into at least one clamper, loading the coil such that the head portion that has been two-dimensionally formed by the bending device is interposed between the molding jigs, three-dimensionally forming the head portion while the molding jigs are brought tightly close together by the at least one clamper, and moving the hair pin while three-dimensionally forming the head portion by the same molding apparatus.

The moving of the hairpin to be inserted into the stator core while three-dimensionally forming the head portion may further include aligning the hairpin into a dummy core while forming the hairpin by using the same molding apparatus and inserting the hairpins aligned in the dummy core into slots of the stator core by an extracting gripper unit.

According to an apparatus for molding hairpins and a method of inserting a hairpin using the same according to an exemplary embodiment, molding the hairpins and inserting the molded hairpins may be simultaneously performed by using the molding apparatus, thereby improving productivity by reducing an overall cycle time.

In addition, according to an apparatus for molding hairpins and a method of inserting a hairpin using the same according to an exemplary embodiment, a loading space for loading molded hairpins and a carrier or moving system for the loaded hairpins may be removed, thereby minimizing a work space and reducing investment cost.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

FIG. 5, which includes

The following reference numerals can be used in conjunction with the drawings:
1: stator
3: stator core
5: slot
7: coil
9: dummy core
10: hairpin
11: head portion
13: leg portion
15: decoated portion
20: clamping unit
21: robot arm
23: connection bracket
25: clamper
27: driving portion
29: fitting end
30: fixing indentation
31: fixing chuck
33: fixing block
35: fixing pin
40: mold unit
41: fixing plate
43: mounting hole
45: support bar
47: guide bar
50: molding jig
51: first jig
53: second jig
55: mounting slot
57: molding surface
60: uncoiler
70: heating device
80: bending device
90: cutting device
100: molding apparatus
110: extracting gripper unit

DETAILED DESCRIPTION OF ILLUSTRATIVE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify embodiments of the present invention, parts that are not connected to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

Figure 1:
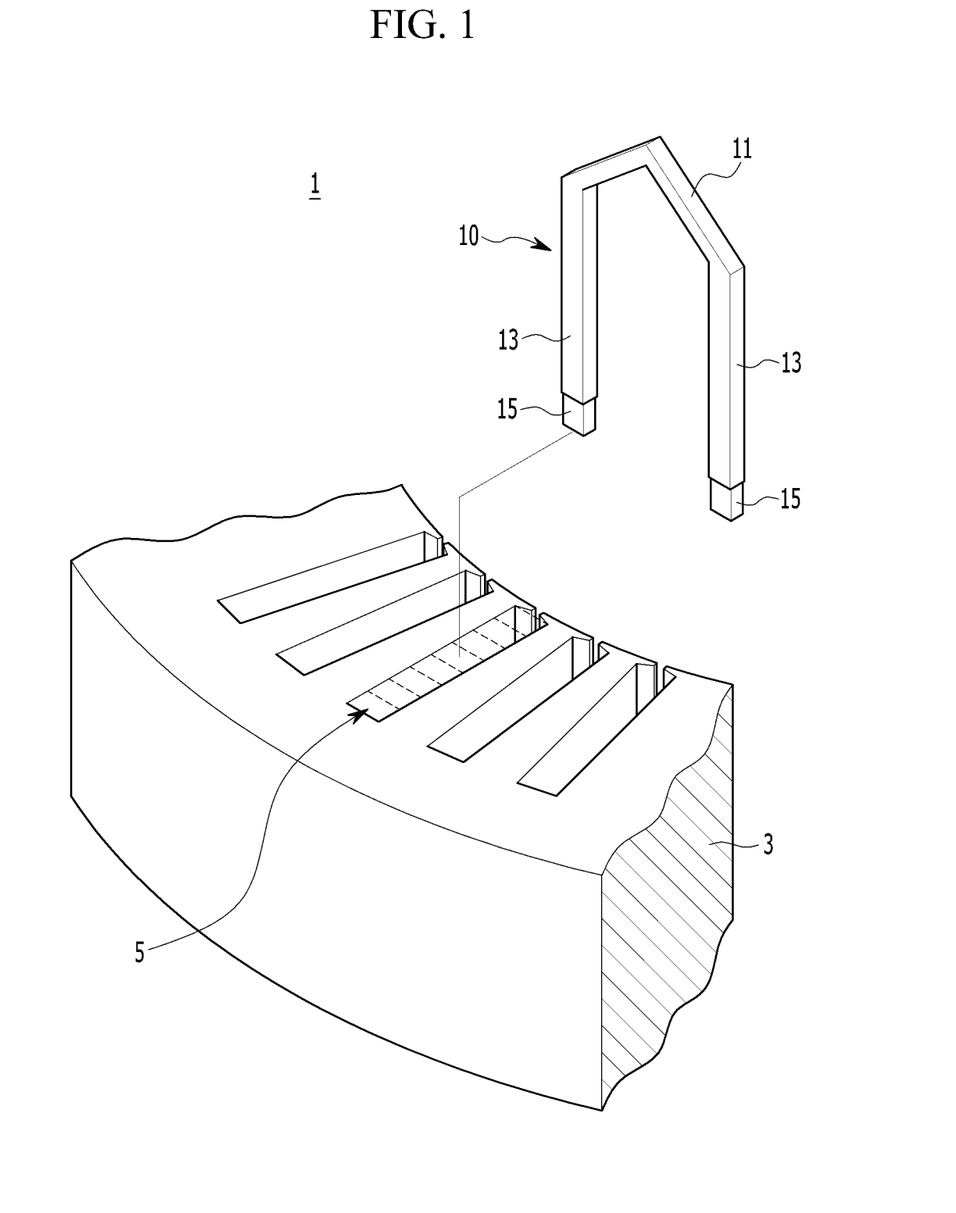
FIG. 1 schematically illustrates a structure of a hairpin winding type stator of a drive motor applied to an exemplary embodiment.

FIG. 1 schematically illustrates a structure of a hairpin winding type stator of a drive motor applied to an exemplary embodiment.

Referring to FIG. 1, a hairpin winding type stator 1 of a drive motor applied to an exemplary embodiment may be applied to a drive motor for an electric vehicle such as a hybrid electric vehicle that outputs driving torque from electrical energy.

Such a drive motor includes a stator 1, a rotor (not shown) disposed with a certain gap with the stator 1, and a plurality of permanent magnets (not shown) installed on the rotor.

The stator 1 includes a stator core 3 formed as a stack of a plurality of electrical steel sheets, and stator coils (hereinafter called hairpins) 10 of a hairpin type are wound on the stator core 3 through a plurality of slots 5.

In addition, the rotor includes a rotor core formed as a stack of a plurality of electrical steel sheets in an axial direction, and the permanent magnet is installed by being inserted in insertion holes provided in the rotor core.

In addition, the hairpins 10 are flat coils, having a pair of leg portions 13 on both sides of a head portion 11, and are generally U-shaped or V-shaped. The hairpins 10 may be formed as flat coils of a square cross-section.

The hairpins 10 are inserted into the predetermined layer (indicated by dotted lines in the drawing) of a slot 5 in the stator core 3. At this time, decoated portions 15 formed at ends of the pair of leg portions 13 protrudes exteriorly from the slot 5 to be exposed below a bottom of the stator core 3, and the decoated portions 15 are welded to form an electrically connected coil winding.

Although it is described above that an exemplary embodiment of the present invention is applied to the stator 1 of a hairpin winding type for a drive motor, the scope of the present invention is not necessarily limited thereto. It may be understood that the technical disclosure of an exemplary embodiment may be applied to a drive motor having the hairpins 10 of various types and uses.

Figure 2:
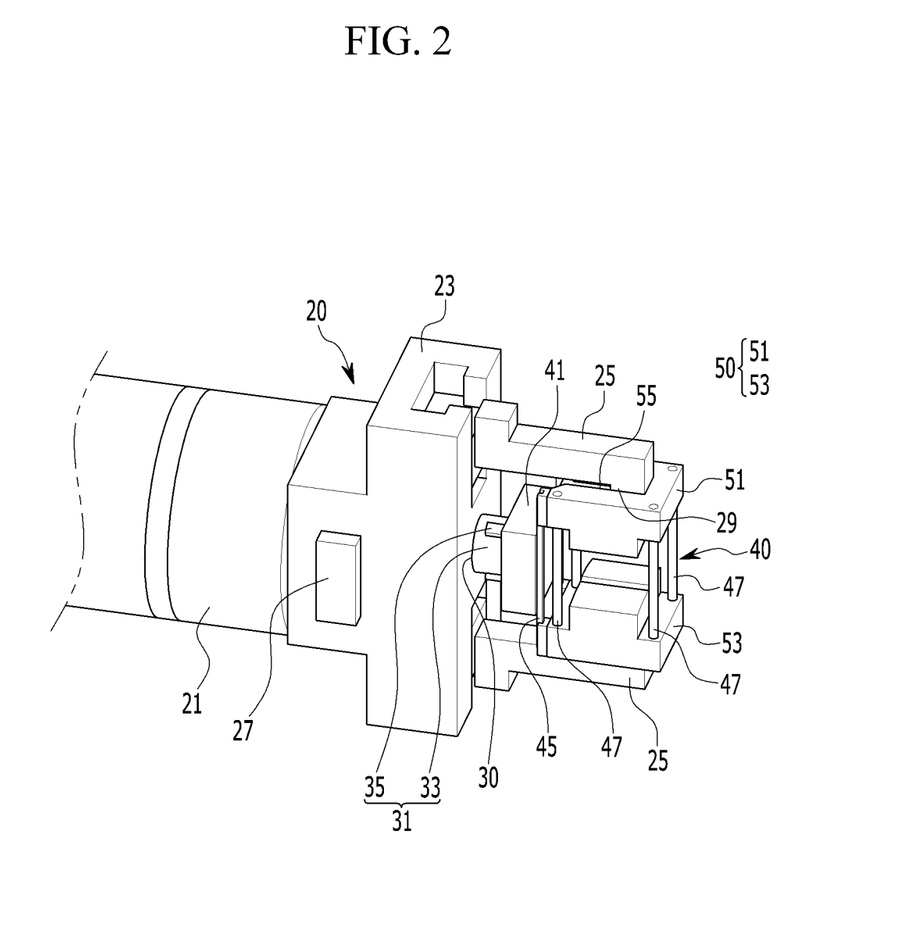
FIG. 2 is a perspective view of an apparatus for molding hairpins according to an exemplary embodiment.
Figure 3:
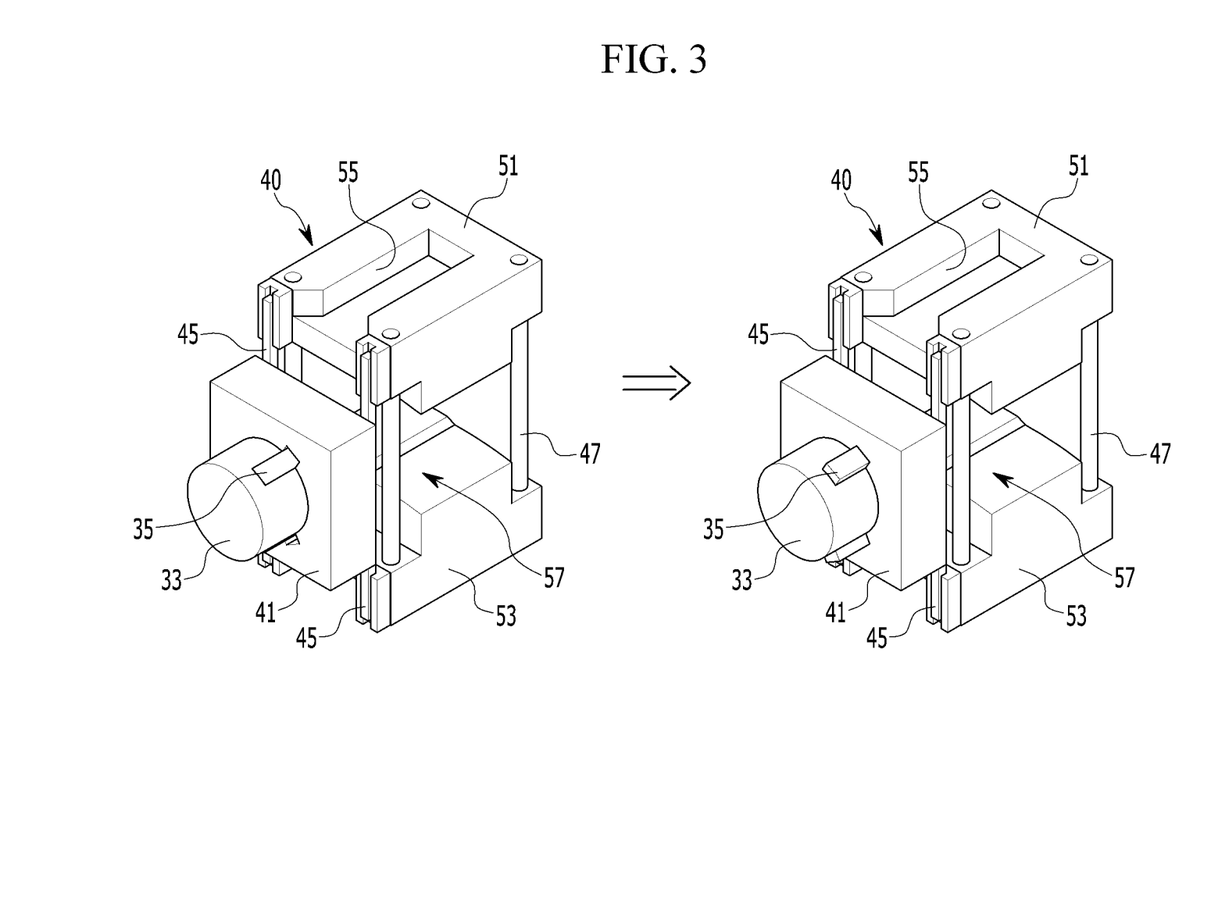
FIG. 3 illustrates an operation of an apparatus for molding hairpins according to an exemplary embodiment.
Figure 4:
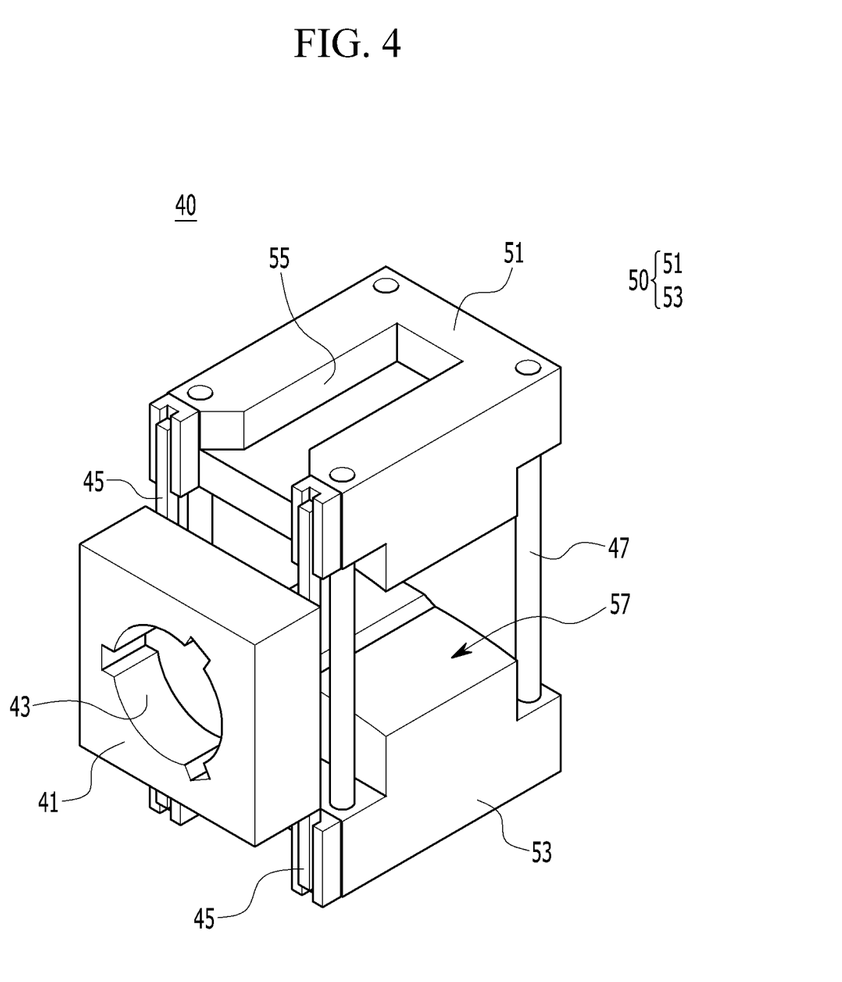
FIG. 4 is a perspective view of an apparatus for molding hairpins according to an exemplary embodiment.
Figure 5A:
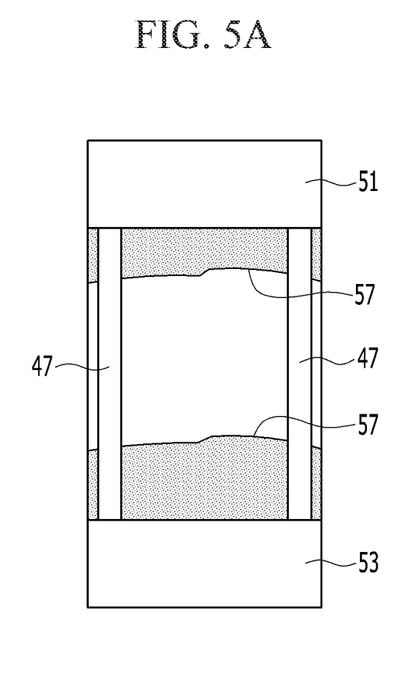
FIGS. 5A and 5B, illustrates an operation of an apparatus for molding hairpins according to an exemplary embodiment.
Figure 5B:
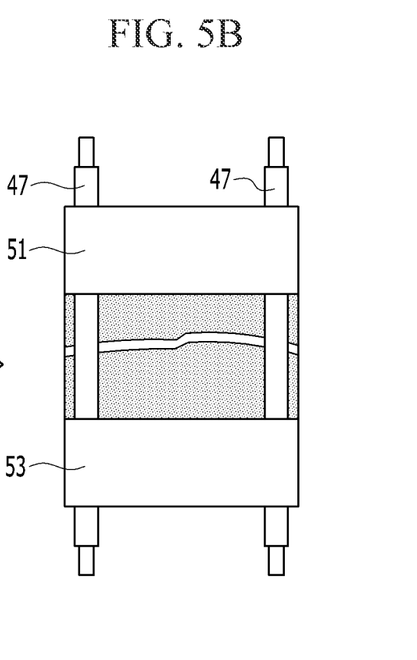

FIG. 2 is a perspective view of an apparatus for molding hairpins according to an exemplary embodiment. FIG. 3 illustrates an operation of an apparatus for molding hairpins according to an exemplary embodiment. FIG. 4 is a perspective view of an apparatus for molding hairpins according to an exemplary embodiment. FIG. 5, which includes FIGS. 5A and 5B, illustrates an operation of an apparatus for molding hairpins according to an exemplary embodiment.

An apparatus for molding hairpins and a method of inserting a hairpin using the same according to an exemplary embodiment unwinds a coil 7 spiral-wound on an uncoiler 60, molds the coil 7 into the hairpins 10 each having the head portion 11, and then inserts the hairpins 10 into the stator core 3, thereby achieving automation of an overall process.

For such a purpose, an apparatus 100 for molding hairpins according to an exemplary embodiment includes a clamping unit 20 and a mold unit 40.

Referring to FIG. 2, the clamping unit 20 is configured at a front end of a multi-axis robot arm 21.

The clamping unit 20 includes a connection bracket 23 mounted on the front end of the robot arm 21.

A pair of clampers 25 is mounted on the connection bracket 23.

The pair of clampers 25 is reciprocally driven in opposite directions in a straight line.

That is, the pair of clampers 25 is formed in a lengthy rod shape, where first ends of the clampers 25 are mounted on the connection bracket 23, and may reciprocate to become closer and farther with reference to a central portion of the connection bracket 23.

At this time, a driving portion 27 driving the pair of clampers 25 may be operated by a pneumatic cylinder.

Alternatively, the pair of clampers 25 may be operated by a drive motor.

The pair of clampers 25 respectively includes second ends facing each other, and a fitting end 29 protrudes on each facing surface of the second ends.

The mold unit 40 is detachably fitted to the fitting end 29.

At this time, the mold unit 40 is detachably coupled with the connection bracket 23 at a position between the pair of clampers 25, by a fixing chuck 31.

Referring to FIG. 3, the fixing chuck 31 includes a fixing block 33 and a fixing pin 35. The fixing block 33 is mounted on a fixing indentation 30 of the connection bracket 23. A plurality of the fixing pins 35 may be disposed along an exterior circumference of the fixing block 33, and may operate to be inserted into the fixing block 33 (refer to the drawing on the left in FIG. 3) and protrude from the fixing block 33 (refer to the drawing on the right in FIG. 3).

The fixing pin 35 has a basic state of being inserted into the fixing block 33, and for coupling to the mold unit 40, protrudes from the fixing block 33 to be coupled with a mounting hole 43 of the mold unit 40.

The fixing pin 35 of the fixing chuck 31 may be pneumatically operated.

Meanwhile, referring to FIG. 4, the mold unit 40 fixed to the connection bracket 23 through the fixing chuck 31 incudes a fixing plate 41, a plurality of support bars 45, and a pair of molding jigs 50.

In more detail, the mold unit 40 is coupled to the fixing chuck 31 through the fixing plate 41.

The fixing plate 41 is formed with the mounting hole 43 for coupling to the fixing chuck 31.

The mounting hole 43 is formed as a hole that may be coupled with the fixing block 33 and the fixing pin 35 installed on the fixing block 33.

In addition, the plurality of support bars 45 are fixed to the fixing plate 41 and the fixing plate 41 is mounted with the pair of molding jigs 50 through the plurality of support bars 45.

The pair of molding jigs 50 includes a first jig 51 and a second jig 53. The first jig 51 and the second jig 53 are slidably coupled with the support bar 45, supported by a plurality of guide bars 47, and reciprocally driven in a straight line along the guide bars 47.

In addition, each of the first jig 51 and the second jig 53 is formed with a mounting slot 55 into which the fitting end 29 of the pair of clampers 25 may be slidably inserted.

That is, the mold unit 40 is mounted on the clamping unit 20 through the fixing chuck 31 while the fitting end 29 is inserted into the mounting slot 55.

Referring to FIGS. 5A and 5B, by the operation of the pair of clampers 25, the first jig 51 and the second jig 53 in the mold unit 40 may become closer or farther and may be brought tightly close together to form the coil 7 therebetween.

At this time, the first jig 51 and the second jig 53 move along the guide bar 47.

Molding surfaces 57 of the first jig 51 and the second jig 53 are formed in shapes corresponding to a desired shape of the head portion 11 of the hairpins 10.

That is, according to an apparatus 100 for molding hairpins according to an exemplary embodiment, the mold unit 40 may be replaced from the clamping unit 20 according to a desired shape of the head portion 11 of the hairpins 10.

The hairpins 10 molded by using an apparatus 100 for molding hairpins may be inserted into the stator core 3 as follows.

Figure 6:
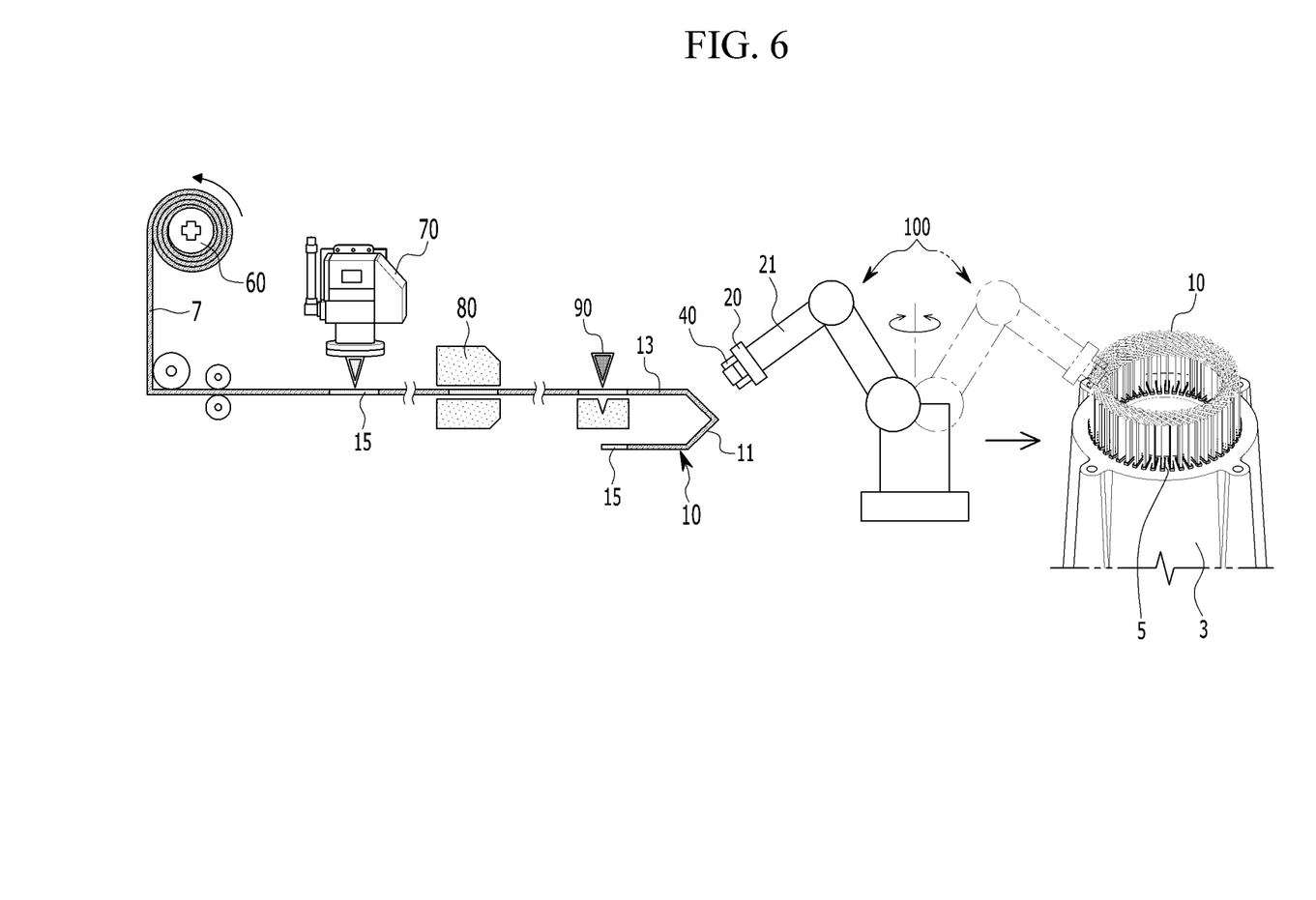
FIG. 6 and FIG. 7 sequentially illustrate a method for inserting hairpins by using an apparatus for molding hairpins according to an exemplary embodiment.
Figure 7:
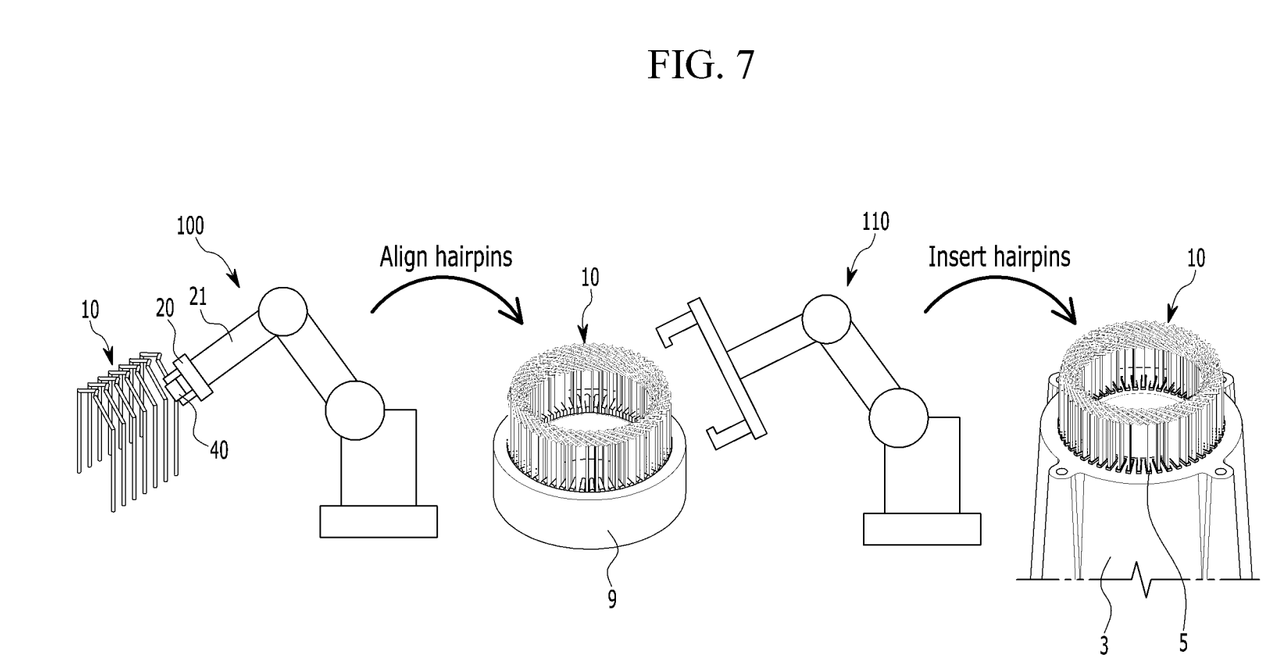

FIG. 6 and FIG. 7 illustrate a sequential method for inserting hairpins by using an apparatus for molding hairpins according to an exemplary embodiment.

Referring to FIG. 6, according to an inserting method of hairpins according to an exemplary embodiment of the present invention, the spiral-wound coil on the uncoiler 60 is unwound first.

At this time, the coil is coated with an insulating film of an enamel material on a copper wire.

Subsequently, the coil is supplied to a heating device 70.

The heating device 70 is a device that heats the coil and peels off the insulating film of the enamel material.

A predetermined portion of the coil is decoated by the heating device 70 to form the decoated portion 15 on the coil.

Subsequently, the coil having the decoated portion 15 is supplied to a bending device 80.

The bending device 80 forms a leg portion 13 and the head portion 11 in the coil.

At this time, the bending device 80 may include a computerized numerical control (CNC) bending device, or a press bending device.

The CNC bending device and the press bending device may be implemented as known in the art.

The bending device 80 is to bend the coil in multiple stages to two-dimensionally form the leg portion 13 and the head portion 11.

The coil formed with the leg portion 13 and the head portion 11 is cut by a predetermined length by using a cutting device 90.

The hairpins 10 are formed in a shape having two leg portions 13 at both sides of the head portion 11.

Here, the decoated portion 15 is formed at the distal end of each leg portion 13 from the head portion 11.

The hairpins 10 may be welded at the decoated portions 15 after being inserted into the stator core 3.

Subsequently, the head portion 11 is molded by the mold unit 40 of a molding apparatus 100.

In more detail, the mold unit 40 corresponding to a desired shape of the head portion 11 is loaded on the clamping unit 20.

That is, while the molding jig 50 is inserted into the pair of clampers 25, the fixing block 33 is coupled with the fixing chuck 31 of the connection bracket 23.

The head portion 11 that has been two-dimensionally formed at the bending device 80 is interposed between the first jig 51 and the second jig 53.

The first jig 51 and the second jig 53 are brought tightly close together by the pair of clampers 25, and thereby the head portion 11 is three-dimensionally formed.

At this time, the molding apparatus 100 molds the hairpins 10 and simultaneously, the molding apparatus 100 moves the molded hairpins 10 to be inserted into the stator core while molding the hairpins 10.

For example, the molding apparatus 100 may mold the hairpins 10 and simultaneously may insert the molded hairpins 10 into the slot 5 of the stator core 3.

Alternatively, referring to FIG. 7, the molding apparatus 100 may mold the hairpins 10 and align the molded hairpins 10 into a dummy core 9 at the same time, and then may simultaneously insert the hairpins 10 aligned in the dummy core 9 into the stator core 3 by an extracting gripper unit 110.

Therefore, according to an apparatus for molding hairpins and a method of inserting a hairpin using the same according to an exemplary embodiment, molding the hairpins 10 and inserting the molded hairpins may be simultaneously performed by using the molding apparatus 100, thereby improving productivity by reducing an overall cycle time.

That is, according to an apparatus for molding a hairpin and a method of inserting a hairpin using the same, full automation from molding of the hairpins 10 to inserting the molded hairpins into the stator core may be enabled.

In addition, according to an apparatus for molding hairpins and a method of inserting a hairpin using the same according to an exemplary embodiment, a loading space for loading molded hairpins and a carrier or moving system for the loaded hairpins may be removed, thereby minimizing a work space and reducing investment cost.

In addition, according to an apparatus for molding hairpins and a method of inserting a hairpin using the same according to an exemplary embodiment, depending on a desired shape of the head portion 11 of the hairpins 10 to be molded, the mold unit 40 may be easily replaced in the clamping unit 20, thereby being capable of handling various types.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for molding a hairpin inserted into a stator core using a clamping unit that includes a connection bracket mounted on a front end of a robot arm and at least one clamper mounted on the connection bracket, the method comprising:
    reciprocally driving the clamping unit in opposite directions in a straight line; and
    press molding a head portion of the hairpin using a molding jig driven by the at least one clamper.

2. The method of claim 1, wherein the at least one clamper comprises a pair of clampers, each of which comprises a first end mounted on the connection bracket and a second end on which a fitting end protrudes; and
    wherein reciprocally driving the clamping unit comprises moving the pair of clampers to become closer and farther with reference to a central portion of the connection bracket.

3. The method of claim 2, further comprising slidably inserting the fitting end into a mounting slot formed in the molding jig.

4. The method of claim 2, wherein the press molding uses a mold unit that is detachably coupled with the connection bracket at a position between the pair of clampers by a fixing chuck, wherein the fixing chuck comprises:
    a fixing block mounted on the connection bracket; and
    a plurality of fixing pins disposed along an exterior circumference of the fixing block, the fixing pins being inserted into the fixing block and protruding from the fixing block.

5. The method of claim 2, wherein the press molding uses a mold unit that is detachably coupled with the connection bracket at a position between the pair of clampers by a fixing chuck, wherein the mold unit comprises:
    a fixing plate coupled to the connection bracket through the fixing chuck;
    a support bar fixed to the fixing plate; and
    a pair of molding jigs coupled with the pair of clampers;
    wherein the press molding comprises driving the pair of clampers to move along the support bar to mold the head portion of the hairpin.

* * * * *